Oct. 25, 1955  F. JOHANNSEN  2,721,794
METHOD OF PROCESSING METAL CONTAINING MATERIALS
Filed May 21, 1951
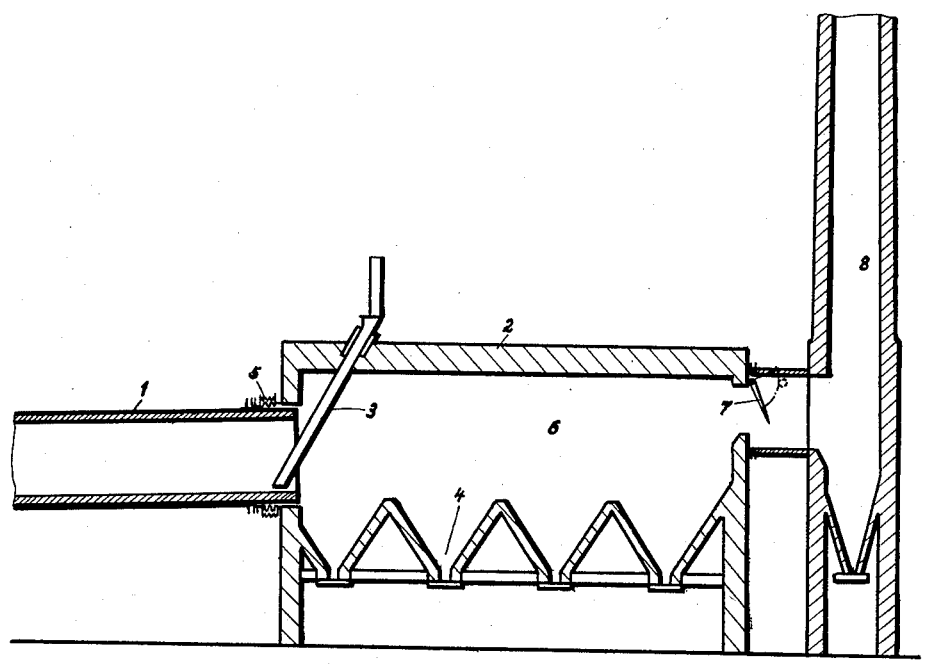
Inventor:
FRIEDERICH JOHANNSEN
by
Toulmin & Toulmin
Attorneys United States Patent Office 2,721,794
Patented Oct. 25, 1955

2,721,794

METHOD OF PROCESSING METAL CONTAINING MATERIALS

Friedrich Johannsen, Clausthal-Zellerfeld, Germany

Application May 21, 1951, Serial No. 227,500

Claims priority, application Germany May 22, 1950

8 Claims. (Cl. 75—36)

When processing metal containing materials in a rotary kiln, a great portion of the reacting air or air for combustion is customarily passed through the kiln due to the natural up-draw of the inclined kiln. Only about one-third of the required air is blown in as primary air together with the heating gas or coal dust, whereas the remainder of the air required for the combustion process is drawn in by the kiln itself, after passing through cooling means, if necessary. Thus a long soft flame is produced which customarily extends over about half the total length of the kiln, said kind of flame being advantageous for most of the processes of the type involved.

When processing metal containing materials such as ores and the like, which contain iron and may also contain nickel, copper and precious metals, in order to obtain metallic slag-free nodules, e. g. according to the Krupp direct smelting process, two distinctively separated zones are present in the kiln. One of these zones is a reducing zone which is located throughout the main portion of the kiln in which zone the oxydic metal compounds are reduced to sponge metal. The other zone which is a short one, is formed at the discharge end of the kiln and is called the "nodulizing zone." In this nodulizing zone, the sponge metal is welded into nodules at materially increased temperature, and the gangue forms a semi-soft slag. In order to regulate this process, the method of flame heating is employed by which it is intended to raise the temperature in the nodulising zone which takes up only one-fourth to one-eighth of the total length of the kiln to the required extent, while at the same time an increase in heating of the reducing zone is to be avoided.

The reduction of metal compounds to sponge metal required a longer time and, therefore, proceeds most advantageously when the heating of the reduction zone is effected only by the combustion of the carbon monoxide, produced during the reduction, with the oxygen still present in kiln gases. If by the method of flame heating large quantities of heat are introduced into the reduction zone, while simultaneously oxygen is withdrawn from said zone, the reduction is concentrated in a short kiln zone and proceeds while using the heat from the flame gases as its source of energy. The produced CO cannot burn from lack of oxygen and will be lost with the exhaust gases without performing any useful effect, thus causing a waste of fuel. The shortening of the reducing zone has the further disadvantage that the reduction of the iron does not proceed completely, so that slags containing FeO are formed which melt easily and make it impossible properly to carry out the nodulizing process.

It has been suggested, in order to make it possible to separate the two steps of reduction and nodulization and to allow each step to proceed properly in its zone, to employ two separate rotary kilns. Such an arrangement, however, creates difficulties in effecting the transfer of the hot charge from the first kiln into the second kiln, while on the other hand the waste gas of the second kiln has an unnecessarily high temperature, so that the entire process becomes uneconomic.

It is therefore, an object of the present invention to provide an improved method of processing metal-containing materials which will overcome the above mentioned drawbacks.

It is also an object of this invention in connection with the processing of metal-containing materials to work with a short flame within the nodulizing zone.

It is still another object of this invention to provide a rotary kiln adapted to carry out the new method set forth in the preceding paragraphs.

These and other objects and advantages of the present invention will appear more clearly from the following specification in connection with the accompanying drawing which diagrammatically shows a portion of a kiln according to the present invention.

By experiments it has been found that the most favorable conditions for the reduction zone and the nodulizing zone can best be obtained by using a very short flame.

According to the present invention the reduction or restriction of the flame to the area of the nodulizing zone is obtained by limiting the quantity of air, drawn in by the kiln, to such an extent that its oxygen content, when the flame has been turned off, will just suffice to carry out the reduction process in a long zone, and that, on the other hand, when starting the heating by flame, an overpressure greater than atmospheric pressure is produced in the kiln, while the flame is being supplied with the necessary air for combustion, which overpressure, due to the strong whirl created, brings about a considerable reduction in length of the flame.

Since the inclination of the kiln and the difference in temperature between the inlet and outlet for the gases is constant during the operation of the kiln, the drawn-in quantity of air can be reduced only by throttling at the intake and discharge ends of the kiln. Inasmuch as the discharge of the semi-soft charge does not permit a continuous and even throttling of the discharge opening, it is preferable to effect the throttling operation at the intake end of the kiln. A change in the adjustment of the draft in the kiln, when turning the heating means on and off, is not necessary. During the heating period of the kiln an overpressure of 0.5 to 5 millimeters of water above atmospheric will then prevail at the upper portion of the kiln. Also, when the flame has been turned off, the congestion of the kiln gases will still occur at the upper part of the kiln, so that the development of flue dust will be materially less than with the usual methods carried out in rotary kilns.

Therefore, it is furthermore suggested to provide the kiln at its charging end with a gas tight closure which is to be arranged between the rotary kiln part and the stationary charging head, said charging head as a rule serving simultaneously as a chamber for the flue dust. By means of a throttle arranged at the end of this chamber it will be possible to maintain an overpressure of 0.3 to 3.0 millimeter water also in the charging head itself, especially during the heating period. The amount of the overpressure in the chamber and thus also within certain limits in the kiln itself may be varied by adjusting the throttle valve.

In the drawing reference numeral 1 indicates the revolving charging end and 2 the stationary charging head of a rotary kiln. The stationary charging head 2 is provided with a charging tube 3 and is shaped so as to form a flue dust chamber 6 from which the flue dust is removed by way of gates 4. Between the rotary kiln end 1 and the stationary charging head 2 a tight closure 5 is arranged permitting the rotary movement of the kiln. At the end of the flue dust chamber 6 a throttle 7 is arranged by which the gas pressure in the chamber 6 can be regulated. After pressing the throttle 7 the waste gas escapes through the chimney 8.

In order to obtain as perfect a heat transfer as possible in the nodulizing zone from the flame to the charge, and in order to introduce less heat into the reduction zone, it is also suggested to use a fuel of a low gas content with less than 25% volatile substances for heating the kiln. If desired, a mixture of coal having a high gas content with fuel of a low gas content such as non-bituminous coal, coke breeze, and anthracite fine may be used, said different fuels preferably being ground together. Thus, a strongly radiating flame is obtained, which, in spite of the excess in air required to sustain the reactions in the reduction zone, will transfer the heat to the charge in the nodulizing zone in a most satisfactory manner. It is, of course, understood that the present invention is, by no means limited to the particular arrangement described herein but also comprises any modifications within the scope of the appended claims.

What I claim is:

1. A method of processing in a rotary kiln materials containing iron in the form of oxidic iron compounds with or without other metals such as nickel, copper and precious metals by reducing the oxidic iron compounds to iron with a solid carbonaceous reducing agent and in an oxidizing kiln atmosphere and transforming the iron into compact nodules, the processing including the step of producing during the heating period an over-pressure of from 0.5 to 5.0 millimeters of water above atmospheric pressure in the upper portion of the reducing zone of said kiln to thereby reduce the flame in the kiln.

2. A method of processing in a rotary kiln materials containing iron in the form of oxidic iron compounds with or without other metals such as nickel, copper and precious metals, by reducing the oxidic iron compounds to iron with a solid carbonaceous reducing agent and in an oxidizing kiln atmosphere and transforming the iron into compact nodules, the processing including the step of reducing the rate of discharge of the gases from the kiln by throttling the gases at the charging end of the kiln so as to produce during the heating period an over pressure of from 0.5 to 5.0 millimeters of water above atmospheric pressure in the upper portion of the reducing zone of said kiln thereby obtaining a reduction in size of the heating flame.

3. A method of processing materials containing iron in the form of oxidic iron compounds with or without other metals such as nickel, copper and precious metals, by reducing the oxidic iron compounds to iron with a solid carbonaceous reducing agent and in an oxidizing kiln atmosphere and transforming the iron into compact nodules in a rotary kiln having a rotary kiln part and a stationary kiln head, the processing including the steps of preventing the escape of gases from between the rotary kiln part and the kiln head, creating at the charging end of the kiln in said head an over-pressure of from 0.3 to 3.0 millimeters of water above atmospheric pressure, and maintaining said pressure while throttling the discharge of the gases from the kiln so as to adapt the said high pressure to the respective operating conditions.

4. A method of making nodules in a rotary kiln by reducing oxidic iron compounds with or without other metals such as nickel, copper and precious metals to metal with a solid carbonaceous reducing agent and in an oxidizing kiln atmosphere and transforming the metal into nodules, which includes the steps of heating the material to be processed by a fuel having less than 25% of volatile ingredients, and producing during the heating period an over-pressure of from 0.5 to 5.0 millimeters of water above atmospheric pressure in the upper portion of the reduction zone of said kiln to thereby reduce the heating flame.

5. A method of making nodules in a rotary kiln from materials containing iron in the form of oxidic iron compounds with or without other metals such as nickel, copper or precious metals, which includes the steps of heating the material to be processed with a solid carbonaceous reducing agent and in an oxidizing kiln atmosphere by a fuel mixture having less than 25% of volatile ingredients, and producing during the heating period an over-pressure of from 0.5 to 5.0 millimeters of water above atmospheric pressure in the upper portion of the reduction zone of said kiln, to thereby reduce the heating flame, said fuel mixture comprising a coal of a high gas content and a fuel admixed therewith selected from the group consisting of non-bituminous coal, coke breeze, and anthracite fines.

6. A method of processing in a flame heated rotary kiln materials containing oxidic iron compounds by heating the materials with a carbonaceous reducing agent, reducing the oxidic iron compounds to iron in the reducing zone of the kiln while maintaining an oxidizing atmosphere above the materials and heating the iron and slag in the nodulizing zone of the kiln under oxidizing conditions to a temperature sufficiently high to transform the iron into compact nodules, the process including the step of reducing the flame in the kiln by producing a pressure above atmospheric pressure in the upper portion of the reducing zone of the kiln.

7. A method according to claim 6 in which the pressure in the upper portion of the reducing zone is from 0.5 to 5 millimeters of water above atmospheric pressure.

8. A method of processing in a flame heated rotary kiln materials containing oxidic iron compounds by heating the materials with a carbonaceous reducing agent, reducing the oxidic iron compounds to iron in the reducing zone of the kiln while maintaining an oxidizing atmosphere above the materials and heating the iron and the slag in the nodulizing zone under oxidizing conditions to a temperature sufficiently high to transform the iron into compact nodules, the process including the step of reducing the size of the flame in the kiln by throttling the discharge of the gases from the kiln so as to produce a pressure of from 0.5 to 5 millimeters of water above atmospheric pressure in the upper part of the reducing zone of the kiln.

References Cited in the file of this patent

UNITED STATES PATENTS

| | | |
|---|---|---|
| 1,181,244 | Payne | May 2, 1916 |
| 1,848,710 | Gustafsson | Mar. 8, 1932 |
| 2,349,688 | Wood, Jr. | May 23, 1944 |